Patented Sept. 19, 1933

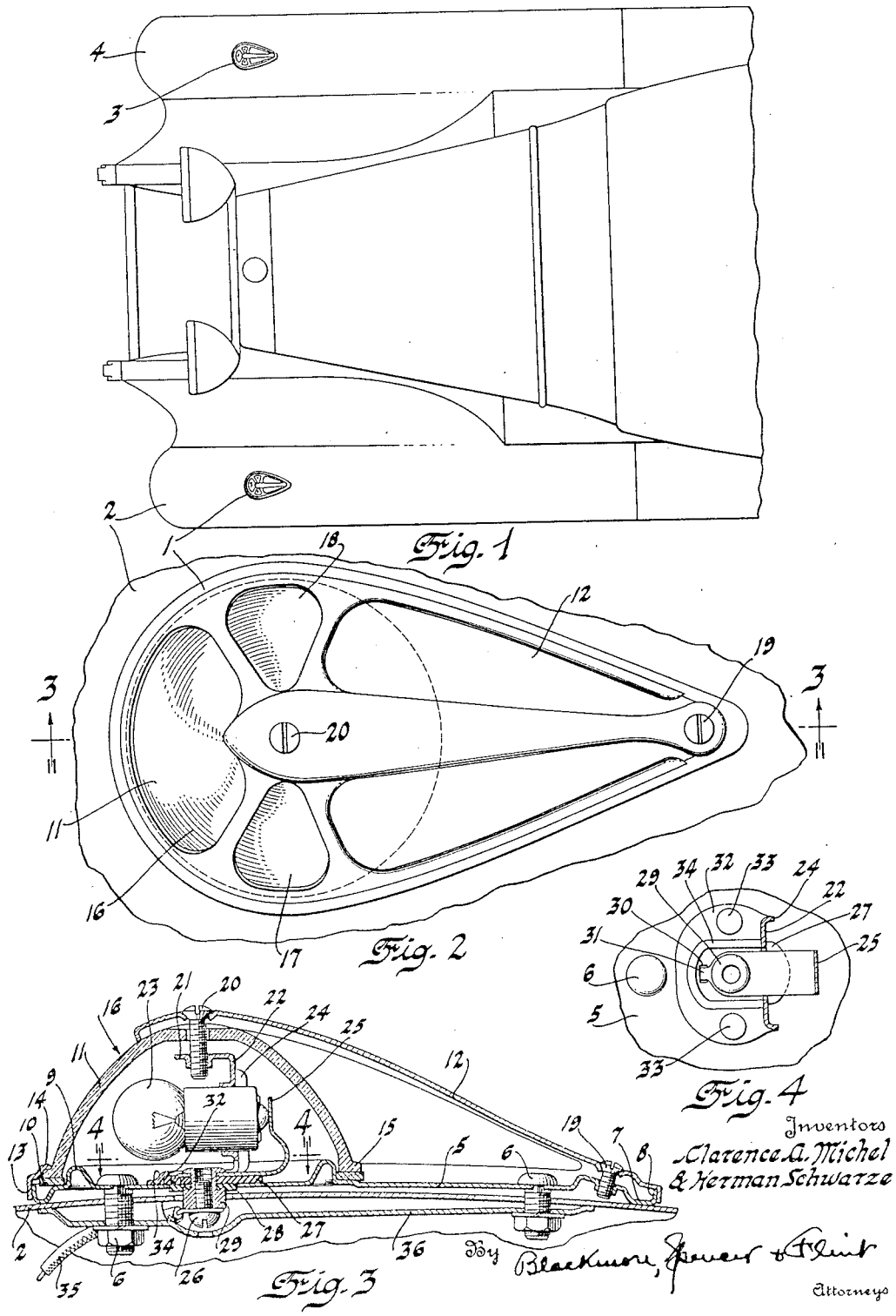

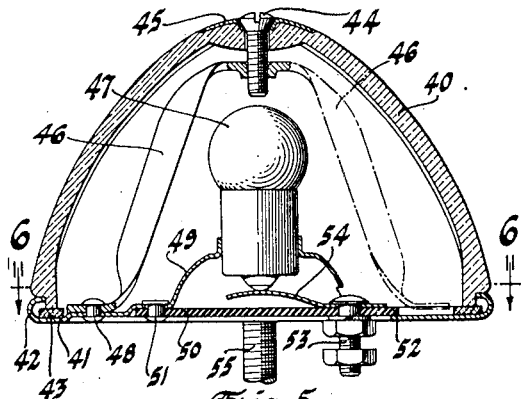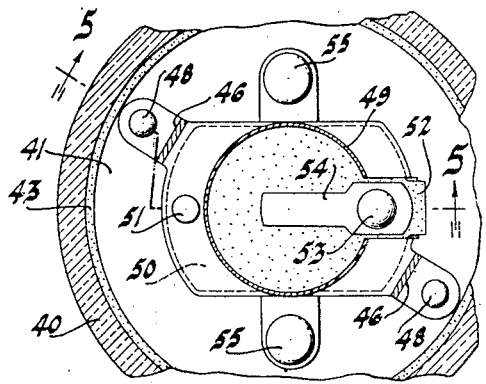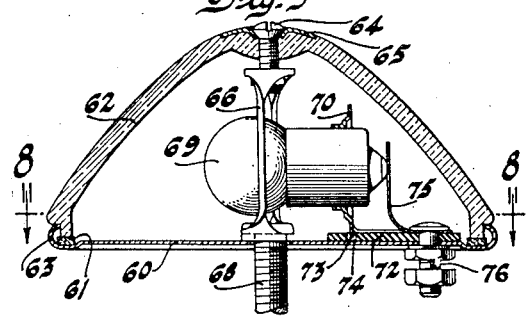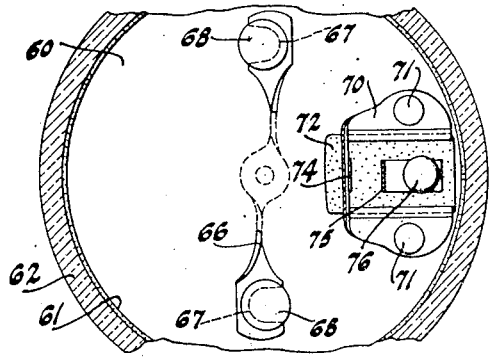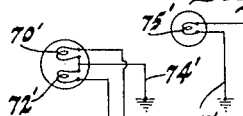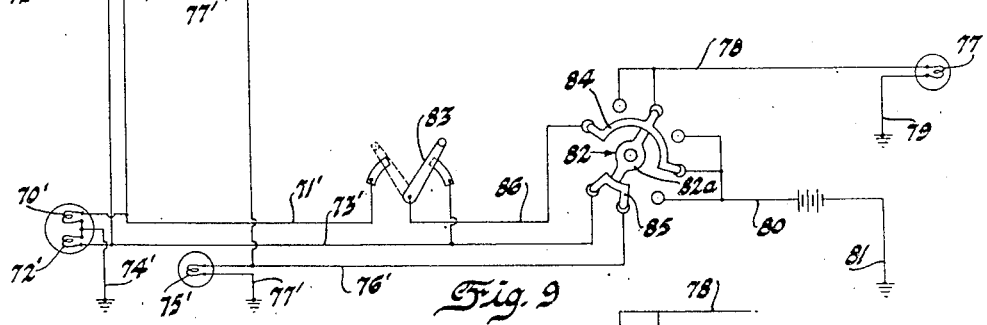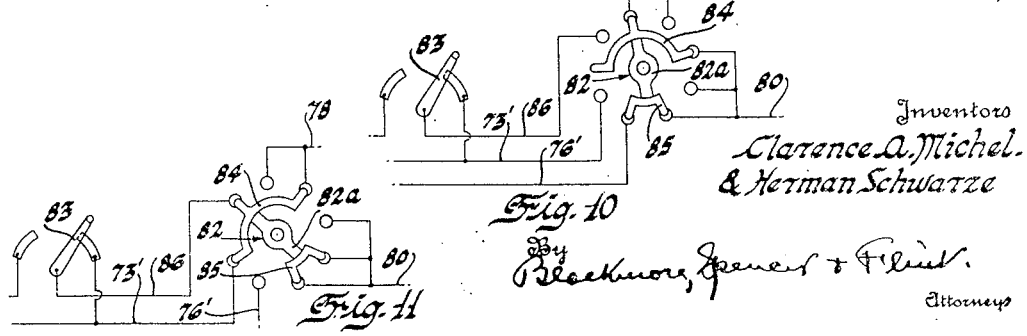

1,927,319

UNITED STATES PATENT OFFICE 1,927,319

FENDER LAMP

Clarence A. Michel, Anderson, Ind., and Herman Schwarze, Birmingham, Mich., assignors to Guide Lamp Corporation, Anderson, Ind., a corporation of Delaware Application March 31, 1930. Serial No. 440,454

10 Claims. (Cl. 240—8.1)

This invention relates generally to an improved auxiliary lamp, and more particularly to an auxiliary lamp adapted to be mounted on the front fenders of motor vehicles.

The primary object of the invention is the provision of an auxiliary lamp of simple and rigid construction in which the elements are so arranged as to be readily attached to the vehicle fender and easily disassembled for access to the interior thereof, and which is so constructed and positioned on the vehicle as to show a light forwardly, and slightly to the rear of the sides thereof so that when controlled by the car lighting circuit disclosed herein, it functions as an aid to safety in night driving.

The lamp structure includes a base plate adapted to be secured to the vehicle fender which functions as a positioning and supporting means for a light bulb and an open-bottomed cover glass or lens which may, if desired, be substantially hemispherical. One of the primary features of our invention consists in the structure of, and the manner of securing together, the foregoing and co-operating elements. In the preferred embodiment, we provide a shield which is positioned over the cover glass or hemispherical dome and formed with openings in the front and sides to permit the passage of light only through such openings and thereby shield the driver's eyes from direct rays from the lamp, while materially increasing the effectiveness and ornamental appeal of the lamp structure. In the use of such shields the side openings therein may be provided only at one side of the shield, if so desired, and reversed as applied to the two front fenders, namely, that on the right fender would be formed with the openings in the right side and that on the left fender with the opening in the left side, and colored pyralin, or the like, provided at such side openings.

The improved fender lamps are preferably combined with a car lighting circuit so that they may be employed in conjunction with the usual tail lamp for parking, and in city driving or when passing other vehicles will be lighted in conjunction with the passing beam which may be provided, as by employing two-filament headlight bulbs, or by employing a resistance in the headlight circuit, or by some other arrangement whereby is obtained a normal driving beam and a passing beam. There are various advantages to be derived by such an arrangement as employed with the structure and location of the fender lamps.

With only the conventional headlamps it is often practically impossible to see a car directly ahead which is emerging from a side street by reason of the fact that the lamps thereof are focused straight ahead, whereas by the provision of my improved fender lamps a light is directed from the sides of the car in position to be readily visible to drivers of cars approaching on side or intersecting streets. Also, when a car provided with fender lamps is either parked or proceeding with the headlights conditioned for the passing beam, such lamps function as "markers" to oncoming drivers by defining the width of the car. Furthermore, the fender lamps serve as an indication to the driver as to whether his headlights are properly conditioned for city driving or when approaching oncoming cars.

We have illustrated several modifications of the invention in the accompanying drawings, in which Figure 1 is a diagrammatic top plan view of the front portion of a vehicle showing the improved fender lamps.

Figure 2 is an enlarged plan view of one embodiment of our invention.

Figure 3 is a longitudinal, vertical sectional view taken on line 3—3 of Figure 2.

Figure 4 is a horizontal sectional view taken on line 4—4 of Figure 3.

Figure 5 is a vertical sectional view of a modified form of the invention, taken substantially on line 5—5 of Figure 6.

Figure 6 is a horizontal sectional view taken on line 6—6 of Figure 5.

Figure 7 is a vertical sectional view, partly in elevation, of a further modified form.

Figure 8 is a horizontal sectional view taken substantially on line 8—8 of Figure 7.

Figure 9 is a diagram of the lighting circuit.

Figures 10 and 11 illustrate further switch positions in the lighting circuit.

Referring now to the drawings, the front portion of an automobile, including the conventional engine hood, main headlights and front fenders is illustrated diagrammatically in Figure 1. As is usual the main headlights are positioned between the longitudinally curved front fenders, and according to the present invention, a fender lamp is fixed on each of these fenders, preferably on the intermediate portion thereof which is of highest elevation, the left fender lamp and fender being indicated generally at 1 and 2, respectively, and the right fender lamp and fender at 3 and 4, respectively.

In the embodiment shown in Figures 2, 3 and 4, the fender lamp 1 includes a base plate 5 of sheet metal which engages the upper surface of the fender 2 and is secured thereto, as by means of the bolts 6 passing through the base plate and fender. This base plate is of the contour generally indicated in Figure 2 consisting of a front semi-circular end portion which tapers rearwardly to a decidedly smaller rounded rear end portion. The main body of the base plate, though substantially horizontal, is slightly curved longitudinally to correspond with the similar curvature of the fender surface from which it is spaced by the depressed peripheral groove 7 engaging the upper fender surface. The extreme peripheral edge of the base plate is flanged upwardly as at 8 for a purpose to be hereafter set forth.

Adjacent its front end the base plate is formed with an upwardly extending circular groove or flange portion 9, the outer wall of this portion serving to position a gasket 10, on which is seated a substantially hemispherical glass dome or lens 11. A rearwardly tapering shield 12 extends over the glass dome and base plate and is positioned with respect thereto by a depending peripheral flange 13 which engages the outer side of the flange 8 on the base plate 5. This shield is preferably of sheet metal, and may, if desired, be suitably finished as by chromium plating to add to its appearance and durability.

The shield 12 is provided at its front end portion with an inturned flange or lip 14 which engages about the annular horizontal flange 15 on the glass dome 11 for substantially half of the circumference thereof corresponding to the extent of the semi-circular end portion of the shield and base plate. Portions of the shield 12 are cut away to provide an opening 16 at the front and openings 17 and 18 at the sides exposing corresponding portions of the dome 11. If desired, the side opening 18 in the shield may be omitted and that portion of the shield formed with a depressed sector of the same contour as the opening 17 to preserve the symmetrical appearance of the structure, which is further enhanced by depressing similar sectors on each side of the rearwardly tapering portion of the shield converging toward the base plate as shown in Figures 2 and 3.

The shield 12 is secured to the base plate 5 by means of the threaded members 19 and 20. The member 19 passes through an aperture in the rear end of the shield into threaded engagement with the corresponding end of the base plate, and the member 20 passes through the highest point of the shield, and through an opening in the top of the dome 11 into threaded engagement with the horizontal arm 21 of the light bulb support 22, which is formed with a suitable opening in its vertical wall to receive and interlock with the socket of the light bulb 23. The vertical wall of the bulb support may be provided with marginal strengthening flanges 24. By positioning the light bulb 23 horizontally with its filament adjacent the front portion of the dome, it will follow that some of the rays will pass slightly to the rear through the side openings 17 and 18.

The light bulb support 22 is secured to the base plate 5 and functions to attach thereto a mounting unit for the current conducting means, including the electric spring contact arm 25 engaging the contact of the bulb socket, and the terminal screw 26 for connection to an electric cable. This mounting unit consists, in addition thereto, of upper and lower insulating plates 27 and 28, respectively, and the terminal post 29 with which the terminal screw 26 has threaded engagement. The hollow terminal post 29 passes through the plates 27 and 28, and the contact arm 25, and secures these members rigidly together by engagement of the enlarged lower portion of said post with plate 28, and engagement of the upper portion with the contact arm 25. The mounting unit may conveniently be assembled by passing the terminal post upwardly through the insulating plates and contact arm and then bending or peening over the upper end of said post as appears in Figure 3. To prevent rotation of the contact arm about the terminal post, the upper plate 27 is provided with a recess 30 in which is positioned a downwardly bent end 31 on the contact arm. The lower plate 28 is substantially rectangular with rounded ends and is positioned within a similarly formed opening through the base plate 5 and thereby held against relative rotation, whereas the upper plate 27 though of similar contour is larger than the plate 28 and the opening in the base plate to thereby rest thereon and prevent downward movement of the mounting unit.

The bottom horizontal arm 32 of the bulb support 22 is cut away to clear the contact arm 25 and the upper end of the terminal post 29 and is secured to the base plate 5 as by rivets or screws 33, with the edges of the horizontal arm adjacent the cutaway portion thereof extended above the plane of the securing portion and bent over so as to overlie the sides and ends of the upper plate 27, as at 34, to thereby secure the mounting unit to the base plate 5.

The terminal post 29 extends downwardly through an opening in the fender 2 and provides for attachment of the electric cable 35 by screw 26 beneath the fender. To protect this terminal connection, as so positioned, we provide the bottom cover 36 which is of elongated channel form with a peripheral flange engaging the under side of the fender. This cover is enlarged below the terminal connection and may be provided with a small drainage aperture in the bottom of this enlargement. Preferably a lateral passage is extended slightly from the right side of the main channel portion of the cover to provide for entrance of the cable 35, and to secure the cover to the fender, the bolts 6 are extended through the cover to thereby function as a securing means for both the base plate 5 and the cover 36.

The foregoing description, while specific to the structure of the left fender lamp 1, is also accurate as a description of the right fender lamp 3, with the exception that in the latter, the cable passage in the bottom cover 36 is formed in the left instead of the right side thereof.

Various changes may be made in this embodiment within the scope of the invention, such as, for instance, combining the openings 16, 17 and 18 into a single opening, or providing an opening in only one side of the shield, in addition to the many obvious changes in details of construction of the bulb support and current conducting means.

Referring now to the modified form of the invention shown in Figures 5 and 6, it will be noted that there is no separate metal shield such as in the preceding form, and that the contour of the fender lamp as a whole comprises that of the substantially hemispherical glass dome or lens 40. The sheet metal base plate 41 is formed with an annular, peripheral flange 42, substantially semi-circular in cross-section, and the free edge of this flange engages the open end of the glass dome 40 and positions the same on the gasket 43 supported on the base plate. To prevent water from entering the interior of the lamp structure, the glass dome may be formed with a rim on its open end which is reduced in thickness to provide a portion thereabove extending laterally beyond the edge of the flange engaging with said rim.

The glass dome is secured to the base plate by means of the screw 44 passing through an opening in a metal washer 45 countersunk in the top of the glass dome so as to lie flush with the surface thereof, and through an alined opening in the top of the glass dome, into threaded engagement with the upper end of a distorted, generally inverted U-shaped, securing strap or member 46. The portions of the securing member 46 depending from the intermediate horizontal attaching portion thereof, diverge on opposite sides of the vertically positioned light bulb 47 and are provided with horizontal base portions secured to the base plate 41, as by rivets 48. To minimize the obstruction of the securing member 46 to passage of light from the light bulb through the dome, the substantially vertical portions thereof are twisted at right angles to the attaching portions into a plane radial to the light bulb. The base plate is raised slightly from the plane of the gasket seat adjacent the base portions of the securing member 46 so that the rivets 48 will not project below the normal bottom plane of the base plate.

The light bulb 47 is mounted in an opening provided in a central portion of the base plate which is bulged upwardly from the normal plane thereof, as indicated at 49, beneath which is positioned the substantially rectangular insulating plate 50, recessed within the bottom of the base plate 41 to which it is secured at one end by the rivet 51, while at the other end, said plate 50 is provided with a projecting tongue 52 overlying an adjacent shelf on the base plate located in the same plane as the gasket seat. The terminal bolt 53 extends through the insulating plate 50 and secures the spring contact arm 54 thereabove with the base plate 41 suitably cut away to afford clearance for said bolt and arm.

The lamp structure in this form is adapted to be secured to an automobile fender or other supporting element by bolts 55 passing through the base plate. It will be understood that the supporting element is provided with a suitable opening to receive the terminal bolt for connection of the electric cable beneath the supporting element, and that such connection may be protected by a cover held in place by the securing bolts 55, or otherwise.

In the modified form illustrated in Figures 7 and 8, the base plate 60 consists of a substantially flat metal disc provided with a slightly depressed annular seat for the gasket 61 which supports the glass dome or lens 62 positioned thereon by the peripheral base plate flange 63. The glass dome is secured to the base plate by the screw 64, metal washer 65, and the distorted, inverted U-shaped securing member or strap 66. These elements are constructed and associated in the same manner as corresponding elements in the preceding form except for the connection to the base plate. For this connection the horizontal base portions of the member 66 are not riveted to the base plate but are provided with oppositely opening slots 67, as shown in Figure 8, which fit about the securing bolts 68 that function to secure the lamp structure to the fender or other supporting element.

In this form the light bulb 69 is mounted horizontally within an opening provided on the vertical wall of the bulb support 70, which as in the structure of Figures 3 and 4, is formed with a horizontal portion secured to the base plate, as by rivets 71, and provided with a central opening to receive the insulating plate 72 with portions extending over the edge thereof to secure said plate 72 to the base plate 60. The bulb support 70 is formed with a tongue 73 engaging within a slot 74 in the insulating plate to prevent relative rotation, and the spring contact arm 75 is secured in place on the insulating plate by the terminal bolt 76 which passes through said arm and through the base plate 60. This lamp structure is adapted to be mounted on the fender or other supporting element in the same manner as the forms heretofore described.

In the structures shown in Figures 5 to 8, inclusive, to confine the passage of light to predetermined paths, we contemplate within the scope of our invention that portions of the glass dome may be stippled, silvered, or otherwise treated, or a metal reflector employed therewith, thereby functioning in a similar capacity to the metal shield set forth in Figures 1 to 4, inclusive, and preventing direct rays from the lamp from striking the eyes of the driver or occupants of an automobile on which such a lamp structure is mounted. Furthermore, in the form shown in Figures 7 and 8, it will be obvious that the vertical wall of the bulb support 70 could be laterally enlarged to function as a shield, and if desired, extended to the securing screw 64 for attachment thereto in the manner shown in Figure 3, thereby dispensing with the securing member or strap 66.

A wiring diagram for operation of our improved fender lamps in the manner heretofore set forth is disclosed in Figures 9, 10, and 11. The lighting circuit, as illustrated, includes double filament headlight bulbs of conventional form for obtaining an upper driving and lower passing beam, but it will be obvious that the circuit may readily be adapted for operation with headlights wherein the intensity of the beam is dimmed as by inclusion of a resistance unit, or in other arrangements wherein the beam is altered to provide a passing beam. The circuit includes the headlight filament 70' for obtaining the upper beam with lead wires 71', the filaments 72' for the lower beam with lead wires 73', and ground wires 74', the fender or side lamp filaments 75' with lead wires 76' and ground wires 77'; the rear or tail lamp filament 77 with lead wire 78 and ground wire 79, and the usual battery with connecting wire 80 and ground wire 81.

Two switches are incorporated in the circuit, namely a primary or hand-operated lighting switch 82 and a secondary or headlight beam control switch 83 which is preferably adapted to be foot-operated. Diagrammatically, the switch 82 consists of an insulated intermediate arm 82a mounted for rotation by means of a suitable operating handle, or the like, and contact sectors at opposite ends thereof, the sector 84 being provided with three contact portions and the sector 85 with two contact portions, which portions are adapted for contact on rotation of the switch with various stationary contacts arranged and connected in the manner clearly shown in Figure 9. The switch 83 is connected by wire 86 with one of the above-mentioned stationary contacts and is pivotally mounted so as to contact with either of two stationary contacts, one connected to wire 71' and the other to wire 73'. It is believed that the wiring arrangement will be more obvious without confusing the drawings with additional reference numerals, by tracing the circuits for the various positions of the switches 82 and 83.

Referring first to Figure 9, when the switch 83 is in the position indicated by full lines, current from the battery passes through wire 80, sector 84 of switch 82, wire 86, switch 83, wire 73', and filaments 72' to ground 74'; also through sector 84, wire 78, and filament 77 to ground 79; and from wire 73' through sector 85 of switch 82, wire 76', and filaments 75' to ground 77'. In this position of the switches, the fender or side lamps are lighted in conjunction with the lower headlight beam and the rear or tail lamp.

By moving switch 83 to the dotted line position shown in Figure 9, the circuit between the wire 86 and the wire 73' is opened, and the circuit closed between wire 86 and wire 71' leading to the headlight filaments 70', thereby shifting from the lower headlight beam to the upper headlight beam and cutting out the fender or side lamps, retaining the same circuit as above to the rear or tail lamp.

In Figure 10, the switch 82 has been rotated counter-clockwise from the position shown in Figure 9, completing the circuits from the battery through wire 80, sector 84, and wire 78 to the filament 77 of the rear or tail lamp, and through sector 85 and wire 76' to filaments 75' of the fender or side lamps, thereby providing the so-called parking position. In Figure 11, the switch 82 has been rotated still further counter-clockwise to the off-position, wherein no circuits are closed and no lamps illuminated.

Though various forms of lamp structures have been set forth herein, we do not desire to restrict ourselves to any particular structure but contemplate all such changes and modifications as come within the scope of the invention as defined by the appended claims. As one instance of changes such as are contemplated, the invention is not restricted to the use of a cover glass and/or shield of the particular forms shown herein. The open-bottomed cover glass could consist of any suitable translucent or transparent material, and instead of being substantially hemispherical could be tapered longitudinally or assume any other desired contour. Similarly, the form of the shield could be modified, not only with respect to the relative size and positioning of the light-emitting openings therein, but the contour of the entire shield could be changed to various ornamental forms, and further, instead of consisting of sheet metal could be cast, or otherwise formed to present any desired appearance.

No claim is made herein to the novel circuit and switch arrangement which constitutes the subject matter of the application of Herman Schwarze, Serial Number 440,481 filed March 31, 1930.

We claim:—

1. An auxiliary lamp for automobiles comprising a base plate, a light bulb, an open-bottomed light transmitting cover supported on said base plate, a light bulb support mounting said light bulb and secured to said cover and base plate, and current conducting means to provide for electrical connection of a cable to said light bulb, said means being secured to said base plate by said bulb support.

2. The elements set forth in claim 1, in which said current conducting means comprises an assembly with portions thereof extending through the base plate and other portions held between said bulb support and base plate.

3. An auxiliary lamp for automobiles comprising a substantially flat base plate which tapers rearwardly from a semi-circular front end portion, an open-bottomed, substantially hemispherical light transmitting cover secured to the front end portion of said base plate, a light bulb within said cover, an open-bottomed opaque shield connected to said cover and base plate and enclosing said cover and tapering rearwardly from the connection with said cover to the connection with said base plate in spaced relation to said cover, and said shield being provided with light transmitting openings adjacent the front end thereof.

4. A lamp unit adapted to be secured to a vehicle fender comprising a base plate, a light bulb support on said base plate, a light bulb on said support, an open-bottomed light transmitting cover secured to said base plate and enclosing said light bulb, an opening in said base plate below said light bulb, a contact engaging with said light bulb within said cover, a terminal post secured within said opening in said base plate with its upper end connected to said contact and its lower end extending below said base plate for connection to an electric cable, and means to secure the same to a vehicle fender provided with an opening through which a portion of said terminal post extends for terminal connection to the electric cable beneath said fender, comprising a cover element for said terminal connection secured beneath the fender by means engaging the base plate of said lamp unit to clamp the fender between said lamp unit and cover element.

5. An auxiliary lamp for automobiles comprising a base plate, a light bulb, an open-bottomed light transmitting cover enclosing said bulb, a bulb support secured to said base plate and extending upwardly therefrom within said cover, and means engaged with the upper end of said bulb support for securing said cover to said base plate.

6. An auxiliary lamp for automobiles comprising a base plate, a light bulb, an open-bottomed light transmitting cover enclosing said bulb and supported on said base plate, a bulb support having its lower end secured to said base plate and extending upwardly therefrom within said cover with its vertical portion provided with an opening to receive the light bulb socket and with a horizontal portion at its upper end, and means engaged with said horizontal portion for securing said cover to said base plate.

7. A fender lamp comprising a base plate, a light bulb mounted on said base plate, an open-bottomed light transmitting cover supported on said base plate and enclosing said light bulb, and an open-bottomed opaque shield engaging about said cover and secured to said base plate adjacent its front end, said shield tapering rearwardly from said front end and secured to said base plate adjacent its rear end.

8. The elements set forth in claim 7, in which the rearwardly tapering portion of said shield is spaced from said cover, and in which the portion of said shield in engagement with said cover is provided with an opening to permit the passage of light therethrough.

9. An auxiliary lamp for automobiles comprising a base plate provided at one end with a substantially circular upstanding flange portion, a light transmitting cover having a substantially circular bottom opening and supported on said base plate and positioned by said flange portion, a light bulb within said cover, and an opaque shield engaging said cover at its front end and extending rearwardly therefrom for connection to said base plate at a point spaced from said cover.

10. The elements set forth in claim 9 in which said shield is secured to said base plate adjacent its front end and engagement with said cover clamps said cover to said base plate.

CLARENCE A. MICHEL.
HERMAN SCHWARZE.